Patented Jan. 17, 1950

2,495,099

UNITED STATES PATENT OFFICE 2,495,099

CACAO BUTTER IN BUTYL RUBBER HEAVILY LOADED WITH BLACK

Staunton R. Harrison and Robert M. Hill, Akron, Ohio, assignors to The Firestone Tire & Rubber Company, Akron, Ohio, a corporation of Ohio No Drawing. Application October 23, 1946, Serial No. 705,230

2 Claims. (Cl. 260—23.7)

This invention relates to a so-called butyl rubber. The rubber is loaded with at least 100 parts by weight of reinforcing black per 100 parts by weight of butyl rubber and is made flexible by compounding therein cacao butter, known technically as *Theobroma cacao.*

Butyl rubber is formed by polymerizing isobutene in the presence of a small percentage of a diolefin, such as, for example, isoprene, butadiene, etc., on the order of 1 up to about 10 per cent, most commonly from 1 to 3 per cent. In order to increase the tensile strength of the rubber and reduce the tendency of the rubber to swell in contact with solvents, oils, etc., it may be compounded with a reinforcing carbon black. As much as 100 or 200 parts or more by weight of the black may be used per 100 parts by weight of butyl rubber. This makes the rubber stiff and boardlike. The addition of carbon black in excess of a certain amount produces no appreciable increase in tensile strength; however, the more black added, the less hydrocarbon per unit of stock and thus the less the tendency to swell.

According to this invention a butyl rubber composition which has been compounded with 100 parts or more by weight of a reinforcing black per 100 parts by weight of butyl rubber is made flexible by adding to the rubber a relatively small amount of cacao butter. The cacao butter and black may be added to the rubber simultaneously, or one may be added before the other in any desired order. The cacao butter is dissolved in the rubber and produces or maintains flexibility without imparting oiliness to the stock. The amount of cacao butter added may vary. For example, to 100 parts by weight of butyl rubber which contains 100 to 200 parts by weight of black, one may employ as little as about 2 parts by weight of the cacao butter and up to about 15 parts by weight. The following formula illustrates a rubber compounded according to this invention, all parts being given by weight:

| | Parts |
|---|---|
| Butyl rubber | 100 |
| Zinc oxide | 5 |
| Sulfur | 2 |
| Mercaptobenzothiazole | 1 |
| Tetramethyl thiuram disulfide | 1 |
| Carbon black | 100 to 200 |
| Cacao butter | 5 |

The black used is reinforcing black, known more particularly as a semireinforcing black. The black imparts tensile strength and antiswelling properties to the rubber. The above composition may be given any suitable cure, such as, for example, 20 minutes at 310° F. The resulting cured material is resilient and flexible; whereas a similar composition not containing the cacao butter is stiff and boardy.

The above formula is merely illustrative, and different accelerators, etc., may be employed without departing from the scope of the invention which is defined in the appended claims.

What we claim is:

1. A cured high carbon, flexible, rubbery composition which contains 100 parts of the rubbery polymerization product of isobutene polymerized in the presence of 1 to 10 per cent of a diolefin by weight of the isobutene, 100 to 200 parts of reinforcing carbon black, and from 2 to 15 parts of cacao butter.

2. A cured rubber composition which is compounded according to the following formula:

| | Parts |
|---|---|
| Rubber | 100 |
| Zinc oxide | 5 |
| Sulfur | 2 |
| Mercaptobenzothiazole | 1 |
| Tetramethyl thiuram disulfide | 1 |
| Reinforcing carbon black | 100 to 200 |
| Cacao butter | 5 | the parts being by weight, the rubber being the rubbery polymerizaion product of isobutene polymerized in the presence of about 1 to 3 per cent of a diolefin by weight of the isobutene.

STAUNTON R. HARRISON.
ROBERT M. HILL.

REFERENCES CITED

The following references are of record in the file of this patent:

UNITED STATES PATENTS

| Number | Name | Date |
|---|---|---|
| 2,290,120 | Thomas | July 14, 1942 |
| 2,363,703 | Sparks et al. | Nov. 28, 1944 |

FOREIGN PATENTS

| Number | Country | Date |
|---|---|---|
| 112,875 | Australia | Apr. 24, 1941 |